(12) United States Patent
Eckel et al.

(10) Patent No.: US 6,417,256 B1
(45) Date of Patent: Jul. 9, 2002

(54) POLYCARBONATE-ABS MOULDING MATERIALS

(75) Inventors: Thomas Eckel, Dormagen; Dieter Wittmann, Leverkusen, both of (DE); Ralph Ostarek; Richard Weider, both of Longmeadow, MA (US); Gisbert Michels, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/509,161

(22) PCT Filed: Sep. 16, 1998

(86) PCT No.: PCT/EP98/05884

§ 371 (c)(1),
(2), (4) Date: Mar. 22, 2000

(87) PCT Pub. No.: WO99/16828

PCT Pub. Date: Apr. 8, 1999

(30) Foreign Application Priority Data

Sep. 29, 1997  (DE) .......................................... 197 42 868

(51) Int. Cl.$^7$ ......................... C08L 69/00; C08L 55/02; C08K 5/523
(52) U.S. Cl. ...................... 524/127; 524/126; 524/141; 525/67; 525/257; 525/316
(58) Field of Search ............................ 525/67; 524/126, 524/127, 141

(56) References Cited

U.S. PATENT DOCUMENTS 5,061,745 A * 10/1991 Wittmann
5,672,645 A *  9/1997 Eckel

FOREIGN PATENT DOCUMENTS

| DE | 4429320 | * | 2/1996 |
| EP | 363608 | * | 4/1990 |
| EP | 436186 | * | 7/1991 |
| EP | 444704 | * | 9/1991 |
| EP | 603664 | * | 6/1994 |
| EP | 610800 | * | 8/1994 |
| EP | 810242 | * | 12/1997 |
| JP | 08-092304 | * | 4/1996 |
| JP | 08-239551 | * | 9/1996 |

* cited by examiner

Primary Examiner—David J. Buttner
(74) Attorney, Agent, or Firm—Joseph C. Gil; Aron Preis; James R. Franks

(57) ABSTRACT

A thermoplastic molding composition containing 1 to 99 parts by weight of aromatic polycarbonate or polyester carbonate and 1 to 99 parts by weight of at least one graft polymer prepared by solution polymerization is disclosed. The graft polymer is characterized in having rubber content of 20 to 50 wt. % and in that the average particle size of its rubber phase is 80 to 600 nm. The composition, which optionally contains additives, flameproofing agents and reinforcing agents, is characterized by its improved mechanical properties.

11 Claims, No Drawings

POLYCARBONATE-ABS MOULDING MATERIALS

CROSS REFERENCE TO RELATED PATENT APPLICATIONS

The present patent application claims the right of priority under 35 U.S.C. §119 (a)–(d) and 35 U.S.C. §365 of International Application No. PCT/EP98/05884, filed Sep. 16, 1998, which was published in German as International Patent Publication No. WO 99/16828 on Apr. 8, 1999, which is entitled to the right of priority of German Patent Application Number 197 42 868.1, filed Sep. 29, 1997.

The present invention relates to polycarbonate-ABS moulding compositions having excellent mechanical properties, in particular an excellent stress cracking behaviour, a high notched impact strength and a high joint line strength.

Polycarbonate-ABS moulding compositions are sufficiently well known (for example, EP-A 363 608, EP-A 345 522, EP-A 640 655).

A specific field of application of these moulding compositions is the production of mouldings having a very. good impact strength. Special graft rubbers prepared by emulsion polymerisation are preferably used in order to obtain or to attain rubber-specific properties in these moulding compositions. The level of the values for the known moulding compositions and of the mouldings produced from them is not always adequate for the production of mouldings having increased impact stress and elastic strain. An increase in the proportion of these graft rubbers prepared by emulsion polymerisation then frequently results in moulding compositions having significant disadvantages as regards their properties (heat deflection temperature, modulus of elasticity).

The object of the present invention is therefore to provide polycarbonate-ABS moulding compositions having excellent mechanical properties, such as an outstanding notched impact strength, an excellent joint line strength, a high modulus of elasticity and a very high stress cracking resistance.

It has now surprisingly been found that the use of particular ABS-polymers leads to polycarbonate-ABS moulding compositions which can be processed to form mouldings having a very good standard of mechanical properties, in particular having an excellent notched impact strength, a high joint line strength, a high modulus of elasticity and an outstanding long-term strength.

The present invention accordingly provides thermoplastic moulding compositions containing A 1 to 99, preferably 15 to 80, particularly preferably 30 to 70 parts by weight of an aromatic polycarbonate or polyester carbonate and B 1 to 99, preferably 15 to 80, particularly preferably 30 to 70 parts by weight of at least one graft polymer prepared by solution polymerisation and having a rubber content of from 20 to 50 wt. %, preferably from 22.5 to 45 wt. % and particularly preferably from 25 to 40 wt. %, based on the graft polymer, and an average particle diameter of the rubber phase of from 80 to 600 nm, preferably from 150 to 400 nm and particularly preferably from 200 to 350 nm, the sum of all the components of the moulding compositions according to the invention amounting to 100 parts by weight.

Component A

Aromatic polycarbonates and/or aromatic polyester carbonates which are suitable according to the invention as component A are known in the literature or can be prepared by methods known in the literature (for the preparation of aromatic polycarbonates, see, for example, Schnell, "Chemistry and Physics of Polycarbonates", Interscience Publishers, 1964, as well as DE-AS 1 495 626, DE-OS 2 232 877, DE-OS 2 703 376, DE-OS 2 714 544, DE-OS 3 000 610, DE-OS 3 832 396; for the preparation of aromatic polyester carbonates, for example, DE-OS 3 007 934).

Aromatic polycarbonates are prepared, for example, by reaction of diphenols with carboxylic halides, preferably phosgene and/or with aromatic dicarboxylic dihalides, preferably benzenedicarboxylic dihalides, by the phase interface method, optionally using chain stoppers, for example, monophenols and optionally using trifunctional or more than trifunctional branching agents, for example, triphenols or tetraphenols.

Suitable aromatic polycarbonates according to the invention are in particular those based on the diphenols corresponding to formula (I)

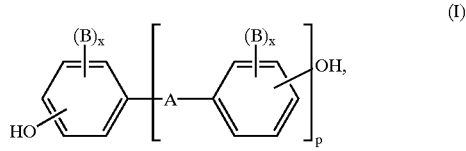

(I)

wherein

A denotes a single bond, $C_1$–$C_5$-alkylene, $C_1$–$C_5$-alkylidene, $C_5$–$C_6$-cycloalkylidene, —S—, —$SO_2$—, —O—, —CO— or $C_6$–$C_{12}$-arylene, which may optionally be condensed with other aromatic rings containing hetero atoms, B independently of one another, denotes halogen, $C_1$–$C_8$-alkyl, $C_6$–$C_{10}$-aryl, preferably chlorine, bromine, phenyl, $C_7$–$C_{12}$-aralkyl, for example, benzyl, x independently of one another, denotes respectively 0, 1 or 2 and p denotes 1 or 0, or alkyl-substituted dihydroxyphenylcycloalkanes corresponding to formula (II),

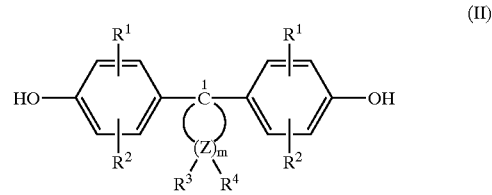

(II)

wherein $R^1$ and $R^2$, independently of one another, denote hydrogen, halogen, preferably chlorine or bromine, $C_1$–$C_8$-alkyl, preferably $C_1$–$C_4$-alkyl, for example, methyl, ethyl, $C_5$–$C_6$-cycloalkyl, $C_6$–$C_{10}$-aryl, preferably phenyl, or $C_7$–$C_{12}$-aralkyl, preferably phenyl-$C_1$–$C_4$-alkyl, in particular benzyl, m is an integer from 4 to 7, preferably 4 or 5, $R^3$ and $R^4$, individually selectable for each Z and independently of one another, denote hydrogen or $C_1$–$C_6$-alkyl, preferably hydrogen, methyl or ethyl and Z denotes carbon, with the proviso that on at least one atom Z, $R^3$ and $R^4$ simultaneously denote alkyl, preferably methyl.

Preferred diphenols are hydroquinone, resorcinol, dihydroxydiphenyl, bis(hydroxyphenyl)-$C_1$–$C_5$-alkanes, bis (hydroxyphenyl)-$C_5$–$C_6$-cycloalkanes, bis(hydroxyphenyl) ethers, bis(hydroxyphenyl) sulphoxides, bis(hydroxyphenyl) ketones, bis(hydroxyphenyl) sulphones and α,α-bis(hydroxyphenyl)diisopropylbenzenes as well as their ring-brominated and/or ring-chlorinated derivatives.

Particularly preferred diphenols are diphenylphenol, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulphide, 4,4'-dihydroxydiphenyl sulphone as well as their di- and tetrabrominated or chlorinated derivatives such as, for example, 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane.

2,2-bis(4-hydroxyphenyl)propane (bisphenol A) is preferred in particular.

The diphenols may be used separately or be mixed together in any proportions.

The diphenols are known in the literature or are obtainable by methods known in the literature.

Suitable chain stoppers for the preparation of the thermoplastic, aromatic polycarbonates are, for example, phenol, p-chlorophenol, p-tert. butylphenol or 2,4,6-tribromophenol, also long-chain alkylphenols, such as 4-(1,3-tetramethylbutyl)phenol according to DE-OS 2 842 005 or monoalkylphenol or dialkylphenols having a total of 8 to 20 C atoms in the alkyl substituents, such as 3,5-di-tert. butylphenol, p-isooctylphenol, p-tert. octylphenol, p-dodecylphenol and 2-(3,5-dimethlheptyl)phenol and 4-(3,5-dimethylheptyl)phenol. The quantity of chain stoppers to be used is generally between 0.5 mol-% and 10 mol-%, based on the molar sum of the diphenols used in each case.

The thermoplastic, aromatic polycarbonates have average weight average molecular weights ($M_w$, determined, for example, by ultracentrifuge or light-scattering measurement) of from 10,000 to 200,000, preferably 20,000 to 80,000.

The thermoplastic, aromatic polycarbonates may be branched in known manner, and in fact preferably by the incorporation of from 0.05 to 2.0 mol-%, based on the sum of the diphenols used, of ≧trifunctional compounds, for example, those having ≧three phenolic groups.

Both homopolycarbonates and copolycarbonates are suitable. To prepare copolycarbonates as component A) according to the invention, it is also possible to use from 1 to 25 wt. %, preferably 2.5 to 25 wt. % based on the total quantity of diphenols used, of polydiorganosiloxanes having hydroxy-aryloxy end groups. These are known (see, for example, U.S. Pat. No. 3,419,634) or can be prepared by methods known in the literature. The preparation of copolycarbonates containing polydiorganosiloxanes is described, for example, in DE-OS 3 334 782.

Besides the bisphenol A homopolycarbonates, preferred polycarbonates include the copolycarbonates of bisphenol A with up to 15 mol-%, based on the molar sum of diphenols, of diphenols other than those mentioned as being preferred or particularly preferred, and in particular of 2,2-bis(3,5-dibromo-4-hydroxyphenyl)propane.

Aromatic dicarboxylic dihalides for the preparation of aromatic polyester carbonates are preferably the diacid dichlorides of isophthalic acid, terephthalic acid, diphenylether-4,4'-dicarboxylic acid and of naphthalene-2,6-dicarboxylic acid.

Mixtures of the diacid dichlorides of isophthalic acid and of terephthalic acid in the ratio of 1:20 and 20:1 are particularly preferred.

For the preparation of polyester carbonates, in addition a carboxylic acid halide, preferably phosgene, is used concomitantly as a bifunctional acid derivative.

Possible chain stoppers for the preparation of the aromatic polyester carbonates, apart from the monophenols already mentioned, are their chloroformic esters as well as the acid chlorides of aromatic monocarboxylic acids, which optionally may be substituted by $C_1$–$C_{22}$-alkyl groups or by halogen atoms, as well as aliphatic $C_2$–$C_{22}$-monocarboxylic chlorides.

The quantity of chain stoppers is from 0.1 to 10 mol-% in each case, based on mols of diphenols in the case of phenolic chain stoppers and on mols of dicarboxylic dichlorides in the case of monocarboxylic chloride chain stoppers.

The aromatic polyester carbonates may also contain incorporated aromatic hydroxycarboxylic acids.

The aromatic polyester carbonates may be linear, or branched in known manner (regarding this, see also DE-OS 2 940 024 and DE-OS 3 007 934).

Compounds which can be used as branching agents are, for example, trifunctional or polyfunctional carboxylic chlorides, such as trimesic trichloride, cyanuric trichloride, 3,3'-4,4'-benzophenonetetracarboxylic tetrachloride, 1,4,5,8-naphthalenetetracarboxylic tetrachloride or pyromellitic tetrachloride, in quantities of from 0.01 to 1 mol-% (based on dicarboxylic dichlorides used), or trifunctional or polyfunctional phenols, such as phloroglucinol, 4,6-dimethyl-2,4,6-tri(4-hydroxyphenyl)hepten-2,4,4-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol), 2-(4-hydroxyphenyl)-2-(2,4-dihydroxyphenyl)propane, tetra(4-[4-hydroxyphenylisopropyl]phenoxy)methane, 1,4-bis[4,4'-di-hydroxytriphenyl)methyl]benzene, in quantities of from 0.01 to 1.0 mol-%, based on diphenols used. Phenolic branching agents may be introduced together with the diphenols and acid chloride branching agents may be introduced together with the acid dichlorides.

The content of carbonate structural units in the thermoplastic, aromatic polyester carbonates can be varied freely.

The content of carbonate groups is preferably up to 100 mol-%, in particular up to 80 mol-% and particularly preferably up to 50 mol-%, based on the sum of ester groups and carbonate groups.

Both the ester content and the carbonate content of the aromatic polyester carbonates may be in the form of blocks or be statistically distributed in the polycondensate.

The relative solution viscosity ($\eta_{rel}$) of the aromatic polyester carbonates is within the range of 1.18 to 1.4, preferably 1.22 to 1.3 (measured on solutions of 0.5 g polyester carbonate in 100 ml methylene chloride solution at 25° C.).

The thermoplastic, aromatic polycarbonates and polyester carbonates may be used on their own or be mixed with one another in any proportions.

Component B

Graft polymers of the ABS type prepared by solution polymerisation are used as component B.

The graft polymer in component B is preferably radically polymerised from a monomer mixture comprising B.1 90 to 20 parts by weight aromatic monoalkenyl compounds, B.2 0 to 50 parts by weight ethylenically unsaturated nitriles, B.3 0 to 30 parts by weight of other copolymerisable compounds, in the presence of 15 to 50 parts by weight, per 100 parts by weight of monomers B.1 to B.3, of a soluble, gel-free butadiene polymer or butadiene-styrene copolymer and in the presence of 50 to 200 parts by weight of a solvent per 100 parts by weight of monomers B.1 to B.3, wherein the solvent is an aliphatic ($C_1$–$C_8$) or cycloaliphatic ($C_5$–$C_6$) alcohol, ketone, ether, ester, nitrile (solvent S 1) or a mixture of (S 1) with an aliphatic, cycloaliphatic or aromatic hydrocarbon (solvent S 2) in the weight ratio S 1:S 2 of from 100:0 to 30:70 and the polymerisation is carried out until the polymer content of the total mixture is 30 to 70 wt. %, with thorough mixing and optionally subsequent addition of controller and initiator, so that the graft polymer contains 20 to 50 wt. % butadiene polymer.

The total rubber content of the graft polymer is preferably from 22.5 to 45 wt. %, particularly preferably from 25 to 40 wt. % and most preferably from 10 to 20 wt. %.

Component B is prepared by solution polymerisation with the use of at least one solvent, selected from aliphatic ($C_1$–$C_8$) or cycloaliphatic ($C_5$–$C_6$) alcohols, ketones, ethers, esters, nitriles or a mixture of at least one of the above-mentioned solvents with an aliphatic or cycloaliphatic $C_4$–$C_{10}$ hydrocarbon and/or aromatic hydrocarbon under special boundary conditions.

Here the polymer content of the total mixture is preferably 30 to 60 wt. %, in particular 35 to 50 wt. %, the total content of solvent is 25 to 60 wt. % and the remainder of the mixture, to 100% in each case, is unreacted monomers.

In the preferred preparation of component B, where solvents or mixtures of solvents from the group (S 1) and optionally from the group (S 2) are used in the given weight ratios 1:0 to 3:7, despite high rubber contents a phase inversion can successfully be passed through rapidly with sufficient conversions, so that a finely dispersed phase of graft rubber is formed.

The preparation of component B may be carried out in batches, semicontinuously and continuously.

In the continuous mode of operation, the solution of the monomers and of the rubber in the solvents may advantageously be polymerised in a continuously filled and thoroughly mixed stirred-tank reactor with a stationary conversion of monomers after the phase inversion of more than 10 wt. %, based on the sum of the monomers, in the first step, and the radically initiated polymerisation can be continued in at least one further step until a conversion of monomers, based on the sum of the monomers, of from 30 to 70 wt. % is achieved, with thorough mixing in one or more additionally continuously operated stirred-tank reactors in series or in a thoroughly mixing plug-flow reactor and/or a combination of both reactor types, residual monomers and solvents can be removed by conventional techniques (for example, in a heat-exchanging evaporator, flash evaporator, extruder evaporator, film or layer evaporator, screw-type evaporator) and be returned to the process. It may also be of advantage to carry out the continuous polymerisation in three steps, the first step being operated with a stationary conversion of monomers before the phase inversion of less than 10 wt. % and the further steps being operated at the conversions described above.

The batchwise or semicontinuous polymerisation can be carried out in one or more filled or partly filled stirred-tank reactors arranged in tandem, with previous addition or thorough mixing of the monomers, of the rubber and of the solvents and polymerisation until the specified conversion of monomers of 30 to 70 wt. % is attained.

For improved thorough mixing and distribution of the rubber introduced, in both the continuous and in the batchwise mode of operation the polymer syrup can be pumped round in a cycle by means of mixing and shearing units. Such "loop operations" are prior art and may be useful for adjusting the particle size of the rubber. More advantageous, however, is the arrangement of shearing units between two separate reactors, in order to avoid back-mixing, which leads to a widening of the particle-size distribution.

The average residence time is 1 to 10 hours. The polymerisation is advantageously carried out at 60° C. to 120° C., preferably at the boiling point of the solvent/polymer mixture. It is advantageous to carry out the polymerisation at standard pressure. It is also feasible, however, to carry out the polymerisation at a slight excess pressure of up to 6 bar.

The viscosities of the stirred or transported media are in the range of at most 150 Pa·s.

The graft polymer can be isolated in known manner by precipitation in solvent, by stripping with water and/or steam or by evaporation until the polymer melts, for example, in flash evaporators, extruder evaporators, helical evaporators, film evaporators, certain layer evaporators, falling-film evaporators or screw-type evaporators.

Solvents and residual monomers can also be removed in stirred multiphase evaporators equipped with kneaders and stripping devices. The concomitant use of blowing agents and entraining agents, for example steam, is possible here, but despite the high quantities of solvent a very low residual monomer content can be attained by simple evaporation methods, even without the use of such entraining agents.

Solvents of the group (S 1) are alcohols such as methanol, ethanol, propanol, isopropanol, butanol, isobutanol, tert. butanol, amyl alcohol, isoamyl alcohol, isooctanol, cyclohexanol, ketones such as acetone, methyl ethyl ketone, methyl isopropyl ketone, cyclopentanone, cyclohexanone; ethers such as tetrahydrofuran, dioxane, ethylene glycol dimethyl, -diethyl, -dipropyl, -diisopropyl ether; esters such as ethyl acetate, propyl acetate, butyl acetate or nitriles such as acetonitrile, propionitrile, butyronitrile. Preferably methyl ethyl ketone and acetone are used.

Solvents of the group (S 2) are aliphatic hydrocarbons such as butane, pentane, hexane, heptane, octane and their respective iso-derivatives, cycloaliphatic hydrocarbons such as cyclopentane, cyclohexane, alkylcyclopentane, alkylcyclohexane, aromatic hydrocarbons such as benzene, toluene, xylenes, ethylbenzene. Preferably toluene and ethylbenzene are used.

Mixtures of acetone and ethylbenzene and mixtures of acetone and toluene are particularly preferred.

It is also possible to use only solvents from the group (S 1). Methyl ethyl ketone is then preferred.

In order to adjust the molar masses, conventional substances for controlling molar mass, such as mercaptans and olefins, may be used, for example, tert. dodecyl mercaptan, n-dodecyl mercapten, cyclohexane, terpinols, dimeric α-methylstyrene etc., in quantities of from 0.05 to 1.0 wt. %, based on copolymerising monomers.

Suitable initiators for the radical polymerisation are peroxides active in grafting which dissociate into radicals; these peroxides include peroxycarbonates, peroxydicarbonates, diacyl peroxides, perketals or dialkyl peroxides and/or azo compounds or mixtures thereof. Examples are azobisisobutyronitrile, azoisobutyric alkyl ester, tert. butyl perpivalate, tert. butyl peroctoate, tert. butyl perbenzoate.

These initiators are used in quantities of from 0.01 to 1 wt. %, based on monomers B.1 to B.3.

Conventional additives, for example, dyes, antioxidants, lubricants, stabilisers, which are known to the person skilled in the art, may be added during the polymerisation or before the working up.

Suitable rubbers for the preparation of component B are preferably soluble, gel-free butadiene polymers, for example, polybutadienes, also styrene-butadiene copolymers in statistical and/or block form, having a high 1,2-vinyl content of from 2 to 40%, preferably from 8 to 25%, based on the double bonds, having molar masses of from 50,000 to 500,000, and including branched and radial polymers having gel contents of <1,000 ppm.

Aromatic monoalkenyl compounds B.1 are preferably styrene, α-methylstyrene, ring-substituted alkylstyrenes, ring-substituted chlorostyrenes.

Preferably acrylonitrile or methacrylonitrile are used as ethylenically unsaturated nitriles B.2.

Copolymerisable compounds B.3 are, for example, acrylic esters such as methyl (meth)acrylate, ethyl (meth)acrylate, tert. butyl (meth)acrylate, esters of fumarate, itaconic acid, maleic derivatives such as maleic anhydride, maleic esters, N-substituted maleimides such as N-cyclohexylmaleimide or N-phenylmaleimide, N-alkylphenylmaleimide, acrylic acid, methacrylic acid, fumaric acid, itaconic acid or amides thereof.

The ABS polymers B which are suitable according to the invention have a rubber content of from 20 to 50 wt. %, preferably from 22.5 to 45 wt. % and particularly preferably from 25 to 40 wt. %, the average particle diameter is from 80 to 660 nm, preferably from 150 to 400 nm and particularly preferably from 250 to 350 nm.

Furthermore the graft polymers B have a degree of grafting preferably of 0.2 to 1 (cf. M. Hoffmann, H. Krömer, R. Kuhn in "Polymeranalytik I", Georg Thieme Verlag Stuttgart 1977) and a gel content of from 30 to 50 wt. % (measured in methyl ethyl ketone).

Besides component B according to the invention, conventional ABS polymers may also be added (cf. EP-A 345 522 or 640 655).

In addition to components A and B according to the invention, the moulding compositions may contain further components, which are described below, with examples. The quantitative data refer in each case to the entire moulding composition.

Vinyl (co)polymers (component C.1) and/or polyalkylene terephthalates (component C.2), each in a quantity of up to 30 wt. % and preferably up to 20 wt. %, may be used as additional thermoplastics. The sum of all components totals 100%.

Component C.1)

Vinyl (co)polymers usable according to the invention as component C.1) are resinous, thermoplastic and rubber-free. They are those composed of at least one monomer from among styrene, α-methylstyrene, ring-alkyl substituted styrene, $C_1$–$C_8$-alkyl acrylate, $C_1$–$C_8$-alkyl methacrylate (component C.1.1) together with at least one monomer from among acrylonitrile, methacrylonitrile, $C_1$–$C_8$-alkyl methacrylate, $C_1$–$C_8$-alkyl acrylate, maleic anhydride and/or N-substituted maleimide (component C.1.2).

$C_1$–$C_8$-alkyl acrylates and $C_1$–$C_8$-alkyl methacrylates are esters of acrylic acid and methacrylic acid respectively and of monohydric alcohols having 1 to 8 C atoms. Methyl methacrylate, ethyl methacrylate and propyl methacrylate are particularly preferred. A particularly preferred methacrylate which may be mentioned is methyl methacrylate.

Thermoplastic copolymers having a composition corresponding to component C.1) may be formed as secondary products during the graft polymerisation for the preparation of component B), especially when large quantities of monomers are grafted onto small quantities of rubber. The quantity of copolymer C.1) to be used according to the invention does not include these secondary products of the graft polymerisation.

The thermoplastic copolymers C.1) contain 50 to 95 wt. %, preferably 60 to 90 wt. %, component C.1.1) and 5 to 50 wt. %, preferably 10 to 40 wt. %, component C.1.2).

Particularly preferred copolymers C.1) are those composed of styrene, with acrylonitrile and optionally with methyl methacrylate, of α-methylstyrene with acrylonitrile and optionally with methyl methacrylate, or of styrene and α-methylstyrene with acrylonitrile and optionally with methyl methacrylate.

The styrene-acrylonitrile copolymers used as component C.1) are known and can be prepared by radical polymerisation, in particular by emulsion polymerisation, suspension polymerisation, solution polymerisation or bulk polymerisation. The copolymers suitable as component C.1) have molecular weights (weight average, determined by light scattering or sedimentation) of between 15,000 and 200,000.

Particularly preferred copolymers C.1) according to the invention are also statistically constructed copolymers of styrene, maleic anhydride and/or N-substituted maleimide which can be prepared from the corresponding monomers by a continuous bulk polymerisation or solution polymerisation, with incomplete conversions.

The proportions of the two components of the statistically constructed styrene-maleic anhydride copolymers suitable according to the invention may be varied within wide limits. The preferred content of maleic anhydride is between 5 and 25 wt. %.

The molecular weights (number average, n) of the statistically constructed styrene-maleic anhydride copolymers suitable according to the invention as component C.1) may vary within wide ranges. The range from 60,000 to 200,000 is particularly preferred.

An intrinsic viscosity of 0.3 to 0.9 dl/g (measured in dimethylformamide at 25° C.) is preferred for these products.

Instead of styrene, the vinyl copolymers C.1) may contain ring-substituted styrenes such as vinyltoluenes, 2,4-dimethylstyrene and other halogen-free substituted styrenes such as α-methylstyrene.

Component C.2)

The polyalkylene terephthalates of component C.2) are reaction products of aromatic dicarboxylic acids or of their reactive derivatives, such as dimethyl esters or anhydrides, and of aliphatic, cycloaliphatic or araliphatic diols, and also mixtures of these reaction products.

Preferred polyalkylene terephthalates contain at least 80 wt. %, preferably at least 90 wt. %, based on the dicarboxylic acid component of terephthalic acid groups and at least 80 wt. %, preferably at least 90 wt. %, based on the diol component, of ethylene glycol and/or 1,4-butanediol groups.

In addition to terephthalic esters, the preferred polyalkylene terephthalates may contain up to 20 mol-%, preferably up to 10 mol-%, of groups from other aromatic or cycloaliphatic dicarboxylic acids having 8 to 14 C atoms or from aliphatic dicarboxylic acids having 4 to 12 C atoms such as, for example, groups from phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

In addition to ethylene. glycol groups and 1,4-butanediol groups, the preferred polyalkylene terephthalates may contain up to 20 mol-%, preferably up to 10 mol-%, of other aliphatic diols having 3 to 12 C atoms or of cycloaliphatic diols having 6 to 21 C atoms, for example, groups from 1,3-propanediol, 2-ethyl-1,3-propanediol, neopentylglycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl) propane and 2,2-bis(4-hydroxypropoxyphenyl)propane (DE-OS 2 407 674, 2 407 776, 2 715 932).

The polyalkylene terephthalates may be branched by the incorporation of relatively small quantities of trihydric or tetrahydric alcohols or of tribasic or tetrabasic carboxylic acids, for example, in accordance with DE-OS 1 900 270 and U.S. Pat. No. 3,692,744. Examples of preferred branching agents are trimesic acid, trimellitic acid, trimethylolethane and trimethylolpropane and pentaerythritol.

Polyalkylene terephthalates which have been prepared exclusively from terephthalic acid and its reactive derivatives (for example, its dialkyl esters) and ethylene glycol and/or 1,4-butanediol, and mixtures of these polyalkylene terephthalates, are particularly preferred.

Mixtures of polyalkylene terephthalates contain 1 to 50 wt. %, preferably 1 to 30 wt. %, polyethylene terephthalate and 50 to 99 wt. %, preferably 70 to 99 wt. %, polybutylene terephthalate.

The polyalkylene terephthalates preferably used generally have an intrinsic viscosity of 0.4 to 1.5 dl/g, preferably from 0.5 to 1.2 dl/g, measured in phenol/dichlorobenzene (1:1 parts by weight) at 25° C. in an Ubbelohde viscosimeter.

The polyalkylene terephthalates can be prepared by known methods (see, for example, Kunststoff-Handbuch, Volume VIII, pages 695 ff., Carl-Hanser-Verlag, Munich 1973).

The moulding compositions according to the invention may additionally contain the conventional additives such as lubricants and mould-release agents, nucleating agents, antistatic agents, stabilisers, dyes, pigments, flameproofing agents and/or reinforcing materials.

The moulding compositions according to the invention preferably contain at least one phosphorus compound corresponding to formula (III)

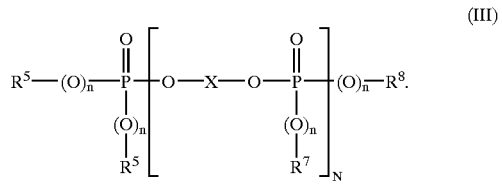

(III)

In the above formula $R^5$, $R^6$, $R^7$, $R^8$, independently of one another, each denote optionally halogenated $C_1$–$C_8$-alkyl, $C_5$–$C_6$-cycloalkyl, $C_6$–$C_{10}$-aryl or $C_7$–$C_{12}$-ar-alkyl; $C_6$–$C_{10}$-aryl or $C_7$–$C_{12}$-aralkyl are preferred. The aromatic groups $R^5$, $R^6$, $R^7$ and $R^8$ may for their part be substituted by halogen, preferably chlorine or bromine, and/or alkyl groups, preferably $C_1$–$C_4$-alkyl, in particular methyl, ethyl. Particularly preferred aryl groups are cresyl, phenyl, xylenyl, propylphenyl or butylphenyl as well as the corresponding brominated and chlorinated derivatives thereof.

X in formula (III) denotes a mononuclear or polynuclear aromatic group having 6 to 30 C atoms. This is derived preferably from diphenols such as; for example, bisphenol A, resorcinol, hydroquinone, biphenyl or their chlorinated or brominated derivatives.

n in formula (III) can, independently of one another, be 0 or 1; preferably n equals 1.

N represents values of from 0 to 30, preferably values from 0.3 to 20, particularly preferably from 0.5 to 10 and in particular from 0.5 to 6.

Both monomeric phosphorus compounds and oligomeric phosphorus compounds may be phosphorus compounds corresponding to formula (III). Mixtures of monomeric phosphorus compounds and oligomeric phosphorus compounds are likewise encompassed by formula (III).

Compounds used in particular as monomeric phosphorus compounds corresponding to formula (III) are organic monomeric phosphates such as tributyl phosphate, tris(2-chloroethyl) phosphate, tris(2,3-dibromopropyl) phosphate, triphenyl phosphate, tricresyl phosphate, diphenylcresyl phosphate, diphenyloctyl phosphate, diphenyl-2-ethylcresyl phosphate, tri(isopropylphenyl) phosphate, halogen-substituted aryl phosphates, dimethyl methylphosphonite, diphenyl methylphosphonite, diethyl phenylphosphonite, triphenylphosphine oxide or tricresylphosphine oxide.

Mixtures of oligomeric phosphorus compounds corresponding to formula (III), preferably oligomeric phosphates corresponding to formula (III), having n values of from 0.5 to 10, in particular from 0.5 to 6, or mixtures of monomeric phosphorus compounds and oligomeric phosphorus compounds corresponding to formula (III) are particularly preferably used as flameproofing agents.

Monomeric and oligomeric phosphorus compounds corresponding to formula (III) are preferably so selected in the mixture that a synergistic effect is achieved. The mixture generally consists to the extent of 10 to 90 wt. % of oligomeric phosphorus compounds and to the extent of 90 to 10 wt. % of monomeric phosphorus compounds, preferably monophosphate compounds corresponding to formula (III).

The monomeric phosphorus compounds are preferably mixed in quantities within the range of 12 to 50 wt. %, in particular of 14 to 40 wt. % and most preferably of 15 to 40 wt. %, with the complementary quantity of oligomeric phosphorus compounds.

The above-mentioned phosphorus compounds are preferably used together with fluorinated polyolefins as a flameproofing combination in quantities of from 0.05 to 5 parts by weight.

The fluorinated polyolefins used have high molecular weights and glass transition temperatures of above −30° C., generally of above 100° C., fluorine contents of 65 to 76 wt. %, in particular 70 to 76 wt. % and average particle diameters $d_{50}$ of from 0.05 to 1,000 μm, preferably from 0.08 to 20 μm. The fluorinated polyolefins generally have a density of 1.2 to 2.3 g/cm³. Preferred fluorinated polyolefins are polytetrafluoroethylene, polyvinylidene fluoride, tetrafluoroethylene, hexafluoropropylene copolymer and ethylene-tetrafluoroethylene copolymer. The fluorinated polyolefins are known (cf. "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, Volume 13, 1970, pages 623–654; "Modern Plastics Encyclopedia", 1970–1971, Volume 46, No. 10 A, October 1970, McGraw-Hill, Inc., New York, pages 134 and 774; "Modern Plastics Encyclopedia", 1975–1976, October 1975, Volume 52, No. 10 A. McGraw-Hill, Inc., New York, pages 27, 28 and 472 and U.S. Pat. Nos. 3,671,487, 3,723,373 and 3,838,092).

They can be prepared by known methods, for example, by polymerisation of tetrafluoroethylene in aqueous medium with a catalyst which forms free radicals, for example, sodium peroxydisulphate, potassium peroxydisulphate or ammonium peroxydisulphate, at pressures of 7 to 71 kg/cm$^2$ and at temperatures of 0° C. to 200° C., preferably at temperatures of 20° C. to 100° C. (For further details see, for example, U.S. Pat. No. 2,393,967). Depending on the form of use, the density of these materials may be between 1.2 and 2.3 g/cm$^3$ and the average particle size between 0.05 and 1,000 µm.

Particularly preferred polyolefins according to the invention are tetrafluoroethylene polymers having an average particle diameter of from 0.05 to 20 µm, preferably from 0.08 to 10 µm, and a density of 1.2 to 1.9 g/cm$^3$.

Suitable fluorinated polyolefins which can be used in powder form are tetrafluoroethylene polymers having an average particle diameter of from 100 to 1,000 µm and densities of 2.0 g/cm$^3$ to 2.3 g/cm$^3$.

Suitable tetrafluoroethylene polymer emulsions are commercial products obtainable, for example, from the firm DuPont as Teflon® 30 N.

They can be used in the form of a coagulated mixture of emulsions of the tetrafluoroethylene polymer with emulsions of the graft polymers.

To prepare a coagulated mixture, firstly an aqueous emulsion (latex) of a graft polymer is blended with a finely dispersed emulsion of a tetrafluoroethylene polymer; suitable tetrafluoroethylene polymer emulsions typically have solids contents of 30 to 70 wt. %, preferably 50 to 60 wt. % and in particular 30 to 35 wt. %.

In the mixture of emulsions, the equilibrium ratio of graft polymer to tetrafluoroethylene polymer is from 95:5 to 60:40. The mixture of emulsions is then coagulated in known manner, for example, by spray drying, freeze drying or coagulation by addition of inorganic or organic salts, acids or bases or of organic solvents which are miscible in water, such as alcohols, ketones, preferably at temperatures of from 20° C. to 150° C., in particular from 50° C. to 100° C. If necessary, the mixture can be dried at 50° C. to 200° C., preferably 70° C. to 100° C.

The moulding compositions according to the invention may in addition contain inorganic reinforcing materials.

The inorganic reinforcing materials used may be glass fibres, optionally cut or ground, glass beads, glass spheres, lamellar reinforcing material such as kaolin, talc, mica, carbon fibres or mixtures thereof. Cut or ground glass fibres are preferably used as reinforcing material, preferably having a length of 1 to 10 mm and a diameter of <20 µm, in a quantity of up to 40 parts by weight; the glass fibres are preferably surface-treated.

The moulding compositions according to the invention may in addition also contain very finely divided, inorganic powders in a quantity of up to 50 parts by weight, preferably up to 20 and in particular from 0.5 to 10 parts by weight.

Very finely divided inorganic compounds comprise compounds of one or more metals of the first to fifth main groups and the first to eighth subgroups of the periodic system, preferably the second to fifth main groups and fourth to eighth subgroups and particularly preferably the third to fifth main groups and fourth to eighth subgroups, with the elements oxygen, sulphur, boron, phosphorus, carbon, nitrogen, hydrogen or silicon.

Preferred compounds are, for example, oxides, hydroxides, hydrous oxides, sulphates, sulphites, sulphides, carbonates, carbides, nitrates, nitrites, nitrides, borates, silicates, phosphates, hydrides, phosphites or phosphonates.

Preferred very finely divided inorganic compounds are, for example, TiN, TiO$_2$, SnO$_2$, WC, ZnO, Al$_2$O$_3$, AlO(OH), ZrO$_2$, Sb$_2$O$_3$, SiO$_2$, iron oxides, Na$_2$SO$_4$, BaSO$_4$, vanadium oxides, zinc borate, silicates such as Al silicates, Mg silicates; unidimensional, two-dimensional or three-dimensional silicates, mixtures and doped compounds are likewise usable. In addition these particles of nanometric size can be surface-modified with organic molecules in order to obtain a better compatibility with the polymers. Hydrophobic or hydrophilic surfaces can be produced in this way.

The average particle diameters are less than equal to 200 nm, preferably less than equal to 150 nm and in particular from 1 to 100 nm.

Particle size and particle diameter invariably refer to the average particle diameter $d_{50}$, determined by ultracentrifuge measurements as described by W. Scholtan et al., Kolloid Z. and Z. Polymere 250 (1972), pages 782 to 796.

The inorganic compounds may be in the form of powders, pastes, sols, dispersions or suspensions. By means of precipitation, sols can be obtained from dispersions or powders from suspensions.

The powders can be incorporated into the thermoplastic synthetics by conventional methods, for example, by direct kneading or extrusion of the constituents of the moulding composition and the very finely dispersed inorganic powders. Preferred methods are the preparation of a masterbatch, for example, in flameproofing additives, other additives, monomers, solvents, in component A or the coprecipitation of dispersions of the graft rubbers with dispersions, suspensions, pastes or sols of the very finely.divided inorganic materials.

The moulding compositions according to the invention may contain, in addition to the specified flameproofing agents, from 0.01 to 10 wt. %, based on the total moulding composition, of a further, possibly synergistically acting flameproofing agent. Further flameproofing agents mentioned by way of example are halogenated organic compounds such as decabromobisphenyl ether, tetrabromobisphenol, inorganic halides such as ammonium bromide, nitrogen compounds such as melamine, melamine-formaldehyde resins, inorganic hydroxyl compounds such as Mg hydroxide, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate and tin oxide, as well as siloxane compounds.

The moulding compositions according to the invention, consisting of the individual components and optionally additives, are prepared by mixing the respective constituents together in known manner and by melt-compounding and melt-extruding the mixtures at temperatures of from 200° C. to 300° C. in conventional units such as kneaders, extruders and double-shaft screw-type extruders. Where inorganic reinforcing materials and/or very finely divided powders are added, the masterbatch technique is particularly suitable.

The individual constituents can be mixed together in known manner either in succession or simultaneously, in fact at about 20° C. (room temperature) as well as at more elevated temperatures.

The moulding compositions of the present invention can be used for the production of mouldings by injection moulding. Examples of mouldings which can be produced are parts of all types of housings, for example, for domestic appliances such as fruit presses, coffee machines, mixers, for office machines, or cover plates for the construction sector and parts for the automobile sector. They are also used in the field of electrical engineering, because they have very good electrical properties.

Another form of processing is the production of mouldings by deep drawing from previously produced plates and films.

The thermoplastic moulding compositions according to the invention, owing to their very good processing properties and their very good mechanical properties, in particular their outstanding combination of the properties of notched impact strength and high modulus, are suitable for the production of mouldings of any type, in particular those having increased requirements as regards resistance to fracture.

Fields of use are in the data systems technology sector such as, for example, parts of housings for monitors, printers and copiers. These require mouldings having complicated shapes and relatively thin wall thicknesses.

The present invention accordingly also provides the use of the moulding compositions according to the invention for the production of mouldings of any type, preferably that mentioned above, as well as the mouldings produced from the moulding compositions according to the invention.

EXAMPLES

Component A

Linear polycarbonate based on bisphenol A having a relative solution viscosity of 1,252, measured in $CH_2Cl_2$ as solvent at 25° C. and in a concentration of 0.5 g/100 ml.

Component B

The graft polymer B is prepared as follows.

A solution (prepared under nitrogen at 40° C. to 50° C.) of 72 parts by weight of a rubber (poly-cis-butadiene co-block styrene, 11 wt. % styrene, solution viscosity 27.5 mPa·s, 5% solution in styrene) in 257 parts by weight styrene, 120 parts by weight acrylonitrile and 229 parts by weight 2-butanone is placed in a 100 l reactor equipped with an anchor mixer (80 rpm) together with 0.95 parts by weight tert. dodecylmercaptan, 0.15 parts by weight 2,5-di-tert. butylphenol and 7.6 parts by weight paraffin oil. After the mixture has been heated to 75° C., a solution of 0.57 parts by weight of tert. butyl perpivalate (60% in a mixture of hydrocarbons) and 0.16 parts by weight tert. butyl peroctoate in 18 parts by weight 2-butanone is added, followed by stirring for approx. 45 min until the end of the phase inversion (detectable by the decline in the torque). The reaction mixture is then polymerised until conversion is complete, in the course of which a further 0.19 parts by weight tert. dodecylmercaptan (dissolved in 37 parts by weight 2-butanone) is added and the temperature is raised (1.5 h at 84° C., 1 h at 87° C., 4.5 h at 90° C.). Thereafter 2 parts by weight p-2,5-di-tert. butylphenol propanoic octyl ester (Irganox 1076, Ciba-Geigy) (dissolved in 11 parts by weight 2-butanone) is added as stabiliser.

The solids content of the polymerisation syrup after the end of the reaction is 39 wt. %. The solution is then evaporated in a ZSK laboratory screw-type evaporator up to a final temperature of 250° C. and granulated. The granular material contains 27 wt. % rubber, the gel content (measured in acetone) is 33 wt. % and the average particle size of the rubber phase (weight average) is approx. 250 nm.

Component C

Styrene-acrylonitrile copolymer having a ratio of styrene to acrylonitrile of 72:28 and an intrinsic viscosity of 0.55 dl/g (measured in dimethylformamide at 20° C.).

Emulsion Graft Polymer (Comparison)

Graft polymer of 45 parts by weight of a copolymer of styrene and acrylonitrile in the ratio of 72:28 on 55 parts by weight of particulate, cross-linked polybutadiene rubber (average particle diameter $d_{50}=0.4$ μm), prepared by emulsion polymerisation.

Triphenyl phosphate (Disflamoll TP from the firm Bayer, Leverkusen, Germany)

Antidripping Agent

Tetrafluoroethylene polymer in the form of a coagulated mixture comprising a SAN [styrene-acrylonitrile] graft polymer emulsion, corresponding to the above-mentioned component, in water and a tetrafluoroethylene polymer emulsion in water. The weight ratio of graft polymer to tetrafluoroethylene polymer in the mixture is 90 wt. % to 10 wt. %. The tetrafluoroethylene polymer emulsion has a solids content of 60 wt. % and the average particle diameter is between 0.05 and 0.5 μm. The SAN graft polymer emulsion has a solids content of 34 wt. % and an average latex diameter $d_{50}=0.28$ μm.

Preparation

The emulsion of the tetrafluoroethylene polymer (Teflon 30 N from the firm DuPont) is mixed with the emulsion of the graft polymer and the resulting mixture is stabilised with 1.8 wt. %, based on the polymer solids content, of phenolic antioxidants. At a temperature of 85° C. to 95° C. the mixture is coagulated at pH 4 to 5 with an aqueous solution of $MgSO_4$ (Epsom salts) and acetic acid, filtered and washed until virtually free of electrolyte, then freed from the bulk of the water by centrifugation and afterwards dried to a powder at 100° C. This powder can then be compounded with the other components in the units described above.

Mould-release Agent

Pentaerythritol stearate

Production and Testing of the Moulding Compositions According to the Invention

All the components of the moulding composition are mixed together in a 3 l kneader. The mouldings are produced at 260° C. in an injection-moulding machine type Arburg 270 E.

The notched impact strength is determined by the method described in ISO 180 1A on rods having the dimensions 80×10×4 $mm^3$ at room temperature.

The determination of $a_n$ is carried out by the method described in DIN 53 453.

The determination of the heat deflection temperature by Vicat B is carried out in accordance with DIN 53 460 on rods having the dimensions 80×10×4 $mm^3$.

The modulus of elasticity is carried out in accordance with ISO 527/DIN 53 457.

The stress cracking behaviour (ESC behaviour) is tested on rods having the dimensions 80×10×4 $mm^3$. The test medium used is a mixture of 60 vol.-% toluene and 40 vol.-% isopropanol. The test specimens are previously stretched by means of an arc-shaped template (prior stretching in per cent) and stored in the test medium at room temperature. The stress cracking behaviour is assessed from the degree of prior stretching in the test medium at which fracture occurs after an exposure time of 5 minutes.

The flexural modulus of elasticity is determined by the method described in DIN 53 457-B3 on rods having the dimensions 80×10×4 $mm^3$.

TABLE 1

Composition and properties of the polycarbonate graft moulding compositions

| | Example | | | |
|---|---|---|---|---|
| | 1 (Comparison) | 2 | 3 (Comparison) | 4 |
| Components (parts by weight) | | | | |
| A | 60.0 | 60.0 | 69.7 | 69.7 |
| B | — | 24.0 | — | 14.3 |
| Emulsion graft polymer (Comparison) | 24.0 | — | 7.6 | — |
| C | 16.0 | 16.0 | 6.7 | — |
| Triphenyl phosphate | — | — | 11.3 | 11.3 |
| Antidripping agent | — | — | 4.2 | 4.2 |
| Mould-release agent | | | 0.5 | 0.5 |
| Properties: | | | | |
| Vicat $B_{120}$ [° C.] | 120 | 120 | 88 | 90 |
| Notched impact strength $a_k$ [kJ/m$^2$] | 52 | 77 | 58 | 64 |
| Joint line strength $a_n$ [kJ/m$^2$] | — | — | 12.0 | 42.1 |
| Flexural modulus of elasticity [N/mm$^2$] | 2050 | 2390 | 2650 | 2750 |
| MVR 240° C./5 kg [ml/10 min] | — | — | 13.7 | 14.3 |
| ESC behaviour Fracture at [%] | 0.6 | 1.0 | 2.4 | * |

*After 10 minutes no fracture

The moulding compositions according to the invention, despite lower rubber content, show a higher notched impact strength accompanied by higher modulus of elasticity and improved stress cracking resistance.

What is claimed is:

1. A thermoplastic moulding composition containing:
   A 1 to 99 parts by weight of an aromatic polycarbonate or polyester carbonate;
   B 1 to 99 parts by weight of at least one graft polymer prepared by solution polymerisation and having a rubber content of from 20 to 50 wt. %, based on the graft polymer, and an average particle diameter of the rubber phase of from 80 to 600 nm,
   wherein said graft polymer B is prepared by radically polymerising a monomer mixture comprising,
      B.1 90 to 20 parts by weight aromatic monoalkenyl compounds,
      B.2 0 to 50 parts by weight ethylenically unsaturated nitrites,
      B.3 0 to 30 parts by weight of other copolymerisable compounds, in the presence of
         15 to 50 parts by weight, per 100 parts by weight of monomers B.1 to B.3, of a soluble, gel-free butadiene polymer or butadiene-styrene copolymer, and in the presence of
         50 to 200 parts by weight of a solvent per 100 parts by weight of monomers B.1 to B.3, until the polymer content of the total mixture is 30 to 70 wt. %, with thorough mixing and optionally subsequent addition of controller and initiator,
      wherein the solvent is a mixture of (i) a solvent S1 selected from aliphatic ($C_1$–$C_8$) alcohol, cycloaliphatic ($C_5$–$C_6$) alcohol, ketone, ether, ester, nitrile and mixtures thereof, and (ii) a solvent S2 selected from aliphatic hydrocarbons, cycloaliphatic hydrocarbons aromatic hydrocarbons and mixtures thereof; and
   C at least one organic phosphorus compound represented by formula (III)

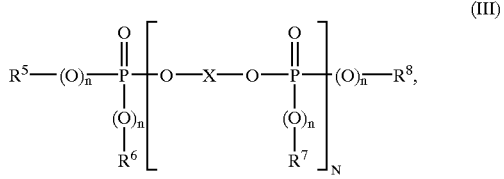

(III)

wherein
   $R^5$, $R^6$, $R^7$, $R^8$, independently of one another, each denote optionally halogenated $C_1$–$C_8$-alkyl, $C_5$–$C_6$-cycloalkyl, $C_6$–$C_{10}$-aryl or $C_7$–$C_{12}$-aralkyl,
   X denotes a mononuclear or polynuclear aromatic group having 6 to 30 C atoms,
   n represents 0 or 1, and
   N represents values from 0.3 to 20.

2. The thermoplastic moulding composition of claim 1 further containing a very finely divided compound selected from TiN, $TiO_2$, $SnO_2$, WC, ZnO, $Al_2O_3$, AlO(OH), $ZrO_2$, $Sb_2O_3$, $SiO_2$, iron oxides, $Na_2SO_4$, $BaSO_4$, vanadium oxides, zinc borate, Al silicates, Mg silicates and mixtures thereof.

3. The moulding composition of claim 1, wherein the aliphatic hydrocarbon of solvent S2 is selected from $C_4$–$C_{10}$ aliphatic hydrocarbons, and the cycloaliphatic hydrocarbon of solvent S2 is selected from $C_4$–$C_{10}$ cycloaliphatic hydrocarbons.

4. The moulding composition of claim 1, wherein the graft polymer B has a rubber content of from 22.5 to 45 wt. % and an average particle diameter of the rubber phase of from 150 to 400 nm.

5. The moulding composition of claim 1, further containing at least one of the following components: ABS polymers; vinyl (co)polymers; polyalkylene terephthalates; fluorinated polyolefins; and inorganic reinforcing agents.

6. The moulding composition of claim 1, containing additives selected from at least one of lubricants, mould-release agents, nucleating agents, antistatic agents, stabilisers, dyes, pigments and flameproofing agents.

7. The thermoplastic moulding composition of claim 1 wherein the weight ratio of said solvent S1 to said solvent S2 is 30:70.

8. The moulding composition of claim 1 further containing a very finely divided compound of one of the first to fifth main groups and the first to eighth subgroups of the periodic system, with at least one element selected from among oxygen, sulphur, boron, carbon, phosphorus, nitrogen, hydrogen and silicon.

9. A method of using the composition of claim 1 comprising molding articles therefrom.

10. A molded article comprising the molding composition of claim 1.

11. The thermoplastic moulding composition of claim 1 wherein said solvent S1 is selected from methyl ethyl ketone, acetone and mixtures thereof, and said solvent S2 is ethylbenzene.

* * * * *